United States Patent
Eltz

[15] 3,645,847
[45] Feb. 29, 1972

[54] MICROBIOLOGICAL HYDROXYLATION OF AROMATIC ACIDS

[72] Inventor: Robert W. Eltz, Media, Pa.
[73] Assignee: Sun Oil Company, Philadephia, Pa.
[22] Filed: Feb. 8, 1968
[21] Appl. No.: 703,870

[52] U.S. Cl. ............................................................. 195/30
[51] Int. Cl. ......................................................... C12b 1/00
[58] Field of Search ........................... 195/28, 301, 3 H, 51

[56] References Cited

UNITED STATES PATENTS

| | | | |
|---|---|---|---|
| 3,383,289 | 5/1968 | Raymond et al. | 195/28 |
| 3,458,399 | 7/1969 | Hosler | 195/28 |

Primary Examiner—A. Louis Monacell
Assistant Examiner—Gary M. Nath
Attorney—George L. Church, Donald R. Johnson, Wilmer E. McCorquodale, Jr. and Stanford M. Back

[57] ABSTRACT

A benzoic acid having from zero to three methyl and/or halo substituents and having at least two adjacent unsubstituted ring carbon atoms can be converted to the corresponding dihydroxybenzoic acid derivative by the action of various species of Nocardia which are normally incapable of performing such a conversion. This is accomplished by first contacting the Nocardia cells with an aromatic or halogenated aromatic hydrocarbon for a time sufficient to induce the enzyme system of said cells to perform such an hydroxylation, and thereafter contacting the induced cells with the benzoic acid substrate under aerobic conditions.

5 Claims, No Drawings

MICROBIOLOGICAL HYDROXYLATION OF AROMATIC ACIDS

BACKGROUND OF THE INVENTION

This invention relates to the microbiological hydroxylation of unsubstituted and substituted benzoic acids having at least two adjacent unsubstituted ring carbon atoms by the action of an induced micro-organism of the genus Nocardia which is normally incapable of effecting such a conversion.

In U.S. Pat. Ser. No. 3,383,289, there is described a process for the microbiological oxidation of methyl-substituted benzene hydrocarbons by various species of Nocardia to form, inter alia, a mixture of the corresponding nonhydroxylated benzoic acids and the dihydroxylated benzoic acid analogues thereof. Of these two elaboration products, the dihydroxylated compound is commercially the more valuable of the two materials. Nevertheless, in each instance where the dihydroxylated compound was formed, substantial amounts of the nonhydroxylated analogue were also recovered. Efforts to convert these nonhydroxylated byproducts to the more valuable dihydroxylated acids by microbial means has heretofore proved to be entirely unsuccessful since, surprisingly, the species of Nocardia which were capable of producing a mixture of both of these products from methyl-benzenes appeared incapable of effecting the desired conversion starting with the corresponding benzoic acid.

It is, therefore, an object of this invention to provide a novel process for the preparation of dihydroxybenzoic acids from unsubstituted or methyl and/or halogen substituted benzoic acids having at least two adjacent unsubstituted ring carbon atoms. It is a further object of this invention to provide a process whereby such benzoic acids may be converted to the corresponding dihydroxy analogues by subjecting them to the action of various species of Nocardia which are normally incapable of effecting such a conversion.

SUMMARY OF THE INVENTION

In accordance with the present invention it has now been found that benzoic acids having from zero to three methyl and/or halogen substituents and having at least two adjacent unsubstituted ring carbon atoms may be dihydroxylated to form the corresponding dihydroxybenzoic acid derivative by subjecting said benzoic acid compound under fermentation conditions to the microbiological activity of a species of Nocardia which is normally incapable of performing such a conversion, said species of Nocardia having been previously contacted with an aromatic or halogenated aromatic inducer defined hereinbelow for a time sufficient to induce the enzyme system of said micro-organism to effect such a dihydroxylation.

PREFERRED EMBODIMENTS OF THE INVENTION

The process of this invention may be conveniently carried out by first establishing a growth of Nocardia cells in a nutrient medium, said cells being normally incapable of hydroxylating a benzoic acid but whose enzyme system is capable of being so induced; thereafter inducing said cells by adding to a dispersion of them an hydroxylation-inducing amount of an inducer as defined below under growth conditions for a period sufficient to induce the cell's enzyme systems to dihydroxylate the above-defined benzoic acid; thereafter subjecting said benzoic acid to the action of the induced cells in the presence of a nutrient medium and under aerobic fermentation conditions; and recovering from the fermentation broth a dihydroxylated derivative of said benzoic acid. Optionally, the benzoic acid substrate may be added to the fermentation medium at the same time that the inducer is added. Under these conditions, however, an induction period of several hours must pass before production of the dihydroxylated product is observed.

In preparing a species of Nocardia for use in the present process, a culture sample is desirably transferred from an agar slant to a shake flask containing a nutritionally adequate medium, including a carbon source on which the organism can grow. In some cases it may be desirable also to have an additional growth-stimulating material present such as peptone, beef extract, yeast extract or the like, although the addition of such materials is not essential. The mixture is then incubated at about 30° C. Either immediately, or after an incubation period of up to about 24 hours depending on the concentration of cells, the inducer is added to the growing culture.

The nutrient medium into which the selected organism is inoculated must contain as mentioned above, in addition to inorganic nutrient and a source of nitrogen, a carbon source which also provides the organism with its energy. While in general any organic substance containing a combined source of carbon and hydrogen, can be used, as for example, carbohydrates or fatty acids, it is preferred that hydrocarbons, and particularly n-paraffins having from two to 30 carbon atoms, such as n-butane, n-dodecane, or n-hexadecane, be employed, and especially the latter compound. Alternatively, depending upon the strain of organism which is selected, certain aromatic hydrocarbons such as benzene may be utilized instead. The carbon source, as for example n-hexadecane, may be added in one batch just prior to inoculation of the medium. Preferably, however, it should be added periodically in small increments throughout the entire course of the fermentation in order to avoid concentrations of this material in the medium which would be toxic to the organism. Although the amount to be added at any given time may vary, depending upon the organism, it is generally desirably to have not more than about 3 ml./liter of n-hexadecane in the vessel at any one time, for a total of about 10 grams/liter of this carbon source, for any given fermentation batch.

The source of nitrogen which is to be included in the nutrient medium can be any inorganic or organic nitrogen-containing compound which is capable of providing nitrogen in a form suitable for metabolic utilization by the micro-organism such as proteins, amino acids, ammonium sulfate, ammonium phosphate, urea of the like.

The inorganic nutrient should be water soluble and provide an adequate source of minerals, preferably in the form of their salts such as iron, sodium and phosphorus compounds. One example of a nutritionally adequate medium, in addition to the carbon-energy source, is as follows:

|  | Grams per liter of water |
| --- | --- |
| urea | 2.0 |
| yeast extract (Difco) | 0.5 |
| $MgSO_4 \cdot 7H_2O$ | 0.2 |
| $Na_2CO_3$ | 0.1 |
| $CaCl_2 \cdot 2H_2O$ | 0.01 |
| $MnSO_4 \cdot H_2O$ | 0.02 |
| $FeSO_4 \cdot 7Y_2O$ | 0.005 |
| $KH_2PO_4$ | 0.8 |
| $Na_2HPO_4$ | 1.2 |

Oxygen can be introduced into the fermentation medium in any form which can be conveniently assimilated by the organism. Preferably, the oxygen should be supplied in the form of a gas, either by bubbling oxygen or air through the liquid medium, or by vigorous agitation of the medium, or both.

The temperature at which the fermentation is conducted, both before and after the addition of the substrate, can be varied from about 20° to 45° C., and preferably is from 25° to 35° C. to ensure adequate growth of the organism. The pH of the fermentation medium should be maintained within a range of from 5.5 to 9.5, and preferably 7.0 to 8.5. Adjustments are often necessary during the course of the fermentation in order to keep the pH within the preferred ranges. This is generally achieved by the periodic addition of sufficient amounts of an alkali metal hydroxide. Following the initial introduction of the substrate to the established fermentation medium, the period of fermentation constituting the second stage of the process should continue for about 24 to 84 hours, and preferably for about 36 to 60 hours.

The compounds which have been found to induce the enzyme systems of Nocardia in order that they may convert benzoic acid compounds to their dihydroxy counterparts are aromatics or halogenated aromatics having at least one aromatic ring with not more than one halogen substituent attached thereto. Desirably, though not essentially, these inducer compounds should contain at least two adjacent ring carbon atoms which are unsubstituted. Preferably, also these inducers should be nonvolatile and nonmetabolizable by the Nocardia organism, although this is not essential either.

Examples of compounds which have satisfactorily induced Nocardia cells to hydroxylate benzoic acid compounds are hydrocarbons such as p-xylene, m-xylene, o-xylene, toluene, benzene, biphenyl, naphthalene, 2-methyl-naphthalene, and tetralin; and halogenated hydrocarbons such as p-chlorotoluene or chlorobenzene. These compounds are desirably added to the growing Nocardia cells prior to the addition of the benzoic acid substrate in hydroxylation-inducing amount, but in amounts which will not be toxic to the micro-organism. These amounts will vary depending upon the inducer and the organism which is used, but should desirably be present in the fermentation medium in amounts greater than 5 p.p.m. of medium, and preferably about 20-200 p.p.m. The inducer is preferably added in amounts sufficient to maintain these concentrations in the medium over a period of time until induction is complete, usually within about 1-12 hours, depending on the growth rate of the organism.

The benzoic acid substrates to be hydroxylated, are as described above, those compounds having from zero to three methyl and/or halo substituents on the aromatic ring and which, additionally, have at least two adjacent unsubstituted ring carbon atoms. Examples of benzoic acid substrates which may be used in this process are such compounds as benzoic acid; p-toluic acid; o-toluic acid; m-toluic acid; 2,5-dimethyl-benzoic acid; 2,3-dimethyl-benzoic acid; 2,3,4-trimethyl-benzoic acid, 3-methyl-4-chlorobenzoic acid; p-chloro-benzoic acid and the like. It will be understood, of course, that inasmuch as the medium must desirably be kept at a neutral pH or higher, the acid substrates will generally be present in the reaction medium in the form of their salts.

When the aforementioned compounds are subjected to the action of the induced Nocardia cells, there are obtained the corresponding dihydroxylated benzoic acids, such as dihydroxy-benzoic acid; 2,3-dihydroxy-p-toluic acid; 2,3-dihydroxy-4,6-dimethyl-benzoic acid; dihydroxy-5,6-dimethyl benzoic acid; 2,3-dihydroxy-4-chloro-5-methylbenzoic acid; 2,3-dihydroxy-p-chloro-benzoic acid; and 2,3dihydroxy-4,5,6-trimethyl-benzoic acid, generally in their alkali metal salt form.

The benzoic acid substrate is desirably added periodically to the fermentation medium in small increments in the form of its water-soluble salt throughout the total fermentation period following the induction period. Together with the substrate should be added small amounts of the aforementioned carbon source, such as n-hexadecane. The amount of each portion of substrate which is added to the medium is generally in the range of from 0.2 to 0.5 gram/liter, and preferably less than about 1 gram/liter.

The dihydroxylated products are conveniently recovered from the fermentation medium by conventional means. Thus, for example, the cells may be separated from the broth by centrifugation or filtering, and the clear broth acidified and treated by extraction with a suitable solvent such as ether, dioxane, or amyl acetate.

The species of Nocardia which may suitably be employed in the process of this invention are those which are normally incapable of converting a benzoic acid to its dihydroxy derivative, but whose enzyme systems are nevertheless capable of being so induced, as described above. One preferred organism for practising this invention is *Nocardia salmonicolor*, ATCC No. 19,149.

Other species of Nocardia which are likewise suitable are those taught in copending Ser. No. 509,621, mentioned above, which describes several species of Nocardia that are capable of oxidizing methylbenzene compounds. Thus, there may advantageously be employed the following additional species of Nocardia, all of which have been classified by Bergey's Manual and which further have been deposited with the American Type Culture Collection, Washington, D.C.:

1. A wild-type strain obtained from soil in Alabama, having characteristics approximately those set forth for *Nocardia corallina* in Bergey's Manual and hence classified as such species. A culture of this strain has been deposited with the American Type Culture Collection in Washington, D.C., under the number ATCC 19,070. Colonies of this micro-organism have an orange color.

2. A reddish-colored mutant obtained by ultraviolet irradiation of ATCC No. 19,070. The mutant has also been deposited with the American Type Culture Collection and has been designated as ATCC No. 19,071.

3. A strain isolated from Pennsylvania soil and likewise classified as *Nocardia corallina*. This micro-organism is orange colored like the first-mentioned wild-type specimen but shows distinct differences in enzymatic oxidative characteristics. A culture deposit of this strain has been designated as ATCC No. 19,148.

4. Another soil isolate classified as per Bergey's Manual as *Nocardia minima* and designated as ATCC No. 19,150.

It will be understood that in addition to the above species this invention also contemplates the use of other species of Nocardia which may routinely be identified by those skilled in the art in accordance with the techniques taught herein to determine their applicability to the present unique process. Amongst such species should be included the constitutive mutants of the Nocardia micro-organisms defined above. By the term "constitutive mutant" is meant those selected organisms which have been mutated by conventional means in order to convert them from a species which will not normally effect the desired conversion in the absence of an inducer to a species which will thereafter perform such a conversion without an inducer having to be present. Examples of other types of constitutive mutants and methods for obtaining them are well known in the art; see, for example, Biochim. Biophys. Acta, 90 (1964) 609-610.

The following examples specifically illustrate embodiments of the invention.

EXAMPLE 1

Thirty-two (32) liters of the following sterilized carbon-free medium were prepared in a sterile 60-liter nominal-capacity fermenter by separately autoclaving three sets of components: a 50 percent (w./v.) urea solution, a mixed phosphate salts solution and a solution of the remaining salts:

| | Grams per liter of water |
|---|---|
| urea | 2.0 |
| yeast extract (Difco) | 0.5 |
| mg. $SO_4 \cdot 7H_2O$ | 0.2 |
| $Na_2CO_3$ | 0.1 |
| $CaCl_2 \cdot 2H_2O$ | 0.01 |
| $MnSO_4 \cdot H_2O$ | 0.02 |
| $Fe SO_4 \cdot 7H_2O$ | 0.005 |
| $KH_2PO_4$ | 0.8 |
| $Na_2HPO_4$ | 1.2 |

The fermenter was a baffled stainless steel tank of 12-inch inner diameter, equipped with a 6-inch bladed turbine impeller. The fermenter was operated at 30° C., with sterile air supplied at 0.33 volume/volume/minute and an agitator speed of 500 r.p.m. The fermenter was inoculated with 3 liters of a well-grown 48-hour culture of *Nocardia salmonicolor*, ATCC No. 19,149, which had been grown in the same medium in a similar vessel to which n-hexadecane had been added continuously at a rate of 5 ml./hour/tank for the first 8 hours and 10 ml./hour/tank during the eighth to 48th hour period. The fermenter was supplied with n-hexadecane continuously at 5 ml./hour/tank from the start to the sixth hour and at 10 ml./hour/tank during the sixth to 17th hour period. At the 17th hour, when moderate growth was reached, the pH of the culture was adjusted to 8.0 with 8 percent aqueous NaOH additions as required. Intermittent benzene addition was also started at the 17th hour at such a rate as to maintain the apparent benzene level in the culture within the range of 75-125 mg./liter, as determined by quantitative ultraviolet analysis of iso-octane extracts of the culture. Also at the 17th hour, 20 grams of p-toluic acid (plus sufficient NaOH to neutralize the acid and dissolve it in water in the form of its sodium salt) was added to the culture. Similar additions were made at the 42nd, 53rd, and 62nd hours, to maintain the p-toluic acid concentration within the 0.3-0.5 gram/liter range. Colorimetric assay for 2,3-dihydroxy-p-toluic acid (DHPT) showed 0.89 gram/liter at the 62nd hour and 1.0 gram/liter at the 70th hour. The presence of DHPT was also confirmed by ultraviolet spectrum and typical mobility and reaction on paper chromatograms. The p-toluic acid was seen to disappear concurrently with DHPT accumulation, as observed on paper chromatograms. Trials made in a manner similar to this fermenter run, but omitting the benzene, showed no disappearance of p-toluic acid or formation of DHPT.

EXAMPLE 2

A fermenter containing 32 liters of sterile medium was prepared and inoculated as described in example 1. The fermenter was operated at 30° C., with sterile air supplied at 0.20 volume/volume/minute and an agitator speed of 500 r.p.m. Normal-hexadecane was supplied continuously at 10 ml./hour/tank for the first 9 hours after inoculation. Ten grams of biphenyl dissolved in 40 ml. of n-hexadecane was added continuously between the 19th and 22nd hours; a similar addition was made between the 57th and 59th hours. At the 20th hour, the pH of the culture was adjusted up to 8.0 with 8 percent aqueous NaOH solution and maintained at that pH throughout the run with NaOH additions as required. Between the 22nd and 45th hours, a 20 percent (w./v.) aqueous solution of p-toluic acid (plus sufficient NaOH to neutralize the acid and dissolve it in water in the form of its sodium salt) was added at the rate of 26 ml./hour/tank. The broth supernatant fluids, as assayed by quantitative ultraviolet analysis, contained 1.25 grams/liter DHPT after 45 hours and 2.0 grams/liter after 66 hours. The presence of DHPT was confirmed by typical paper chromatographic mobility and color reactions. Control runs of this nature from which biphenyl was omitted, showed no p-toluic acid utilization or DHPT formation.

EXAMPLE 3

A growing culture of Nocardia was prepared in the manner described for inoculation preparation in example 1. A 35-ml. portion was transferred to a 300-ml. culture flask, to which was added 4.5 ml. of water, 0.5 ml. of an aqueous sodium p-toluate solution (8 percent w./v. in free acid) and 0.05 ml. of a 30 percent (v./v.) tetralin solution in n-hexadecane. After shaking the flask culture at 30° C. for 9 hours, 0.05 gram/liter of DHPT had accumulated in the broth. Parallel flasks, from which sodium p-toluate or tetralin were omitted, showed no DHPT present.

EXAMPLE 4

A growing culture of Nocardia was grown and exposed to p-xylene in a fermenter in the same manner as the culture was grown and exposed to benzene in example 1, but without p-toluate added. After 7 hours of p-xylene exposure, a 240-ml. sample was removed from the fermenter, the cells were removed from the broth by centrifugation, washed once by resuspending them in 240 ml. of carbon-free mineral salts medium, recentrifuged, and finally resuspended in 240 ml. of the same medium. Thirty-five milliliters of this cell suspension were placed in a culture flask to which was added 0.5 ml. of aqueous sodium p-toluate solution (8 percent w./v. in free acid). After shaking the flask culture at 30° C. for 1 hour, 0.15 gram/liter DHPT was observed in the broth. A similar flask from which the sodium p-toluate was omitted showed no DHPT. In addition, cells prepared in a similar way but with omission of p-xylene addition from the fermenter growth stage, showed no ability to convert sodium p-toluate to DHPT when assayed in washed cell flask experiments in this same manner as the p-xylene-exposed cells.

EXAMPLE 5

The procedures of example 3 were repeated except that m-xylene was substituted for tetralin and the flask was immediately stopped with a cork stopper. After 22 hours, 0.02 gram/liter of DHPT were observed in the broth. The control flask containing no m-xylene did not produce any DHPT whatever.

EXAMPLE 6

The procedures of example 3 are repeated except that o-xylene is substituted for tetralin and the flask is stopped immediately with a cork stopper. The organism employed is *Nocardia corallina* ATCC No. 19,148. After 22 hours, 0.04 gram/liter of DHPT is observed. No DHPT is found in the control flask.

EXAMPLE 7

The procedures of example 3 were repeated substituting 2-methylnaphthalene for tetralin. After 22 hours, 0.11 gram/liter of DHPT were observed in the broth while no DHPT was observed in the control flask.

EXAMPLE 8

The procedures of example 3 were repeated substituting naphthalene for tetralin. After 22 hours, 0.11 gram/liter of DHPT were observed in the broth while no DHPT was observed in the control flask.

EXAMPLE 9

The procedures of example 4 are repeated substituting p-chlorotoluene for p-xylene in the fermenter growth tank. The organism employed is *Nocardia minima*, ATCC No. 19,150. In the flask containing washed-cell suspension and p-toluate, 0.11 gram/liter of DHPT are observed after 1 hour of shaking at 30° C.

EXAMPLE 10

The procedures of example 4 are repeated substituting p-chlorobenzoic acid in the washed-cell flask experiments. The organism employed is *Nocardia sp.*, ATCC No. 19,070. After 1 hour of shaking at 30° C., 0.08 gram/liter of 2,3-dihydroxy-4-chlorobenzoic acid are observed.

EXAMPLE 11

The procedures of example 4 are repeated substituting toluene for p-xylene in the fermenter growth tank. The organism employed is *Nocardia sp.* ATCC No. 19,071. After 22 hours, 0.04 gram/liter of DHPT are observed.

EXAMPLE 12

The procedures of example 3 were repeated substituting mesitylene for tetralin. The results were negative and no DHPT whatever was observed.

EXAMPLE 13

The procedures of example 3 were repeated substituting durene for tetralin. The results were negative and no DHPT whatever was observed.

EXAMPLE 14

The procedures of example 3 were repeated substituting p-dichlorobenzene for tetralin. The results were negative and no DHPT whatever was observed.

The foregoing examples specifically illustrate the preparation of 2,3-dihydroxy-p-toluic acid starting with p-toluic acid. However, fermentations with other benzoic acids enumerated above give analogous results. This is true regardless of the inducer which is employed.

The dihydroxy benzoic acids prepared by the present invention are valuable products having various applications of commercial interest, and particularly as chelating agents, metal deactivators, and dye intermediates.

What is claimed is:

1. A method of hydroxylating a benzoic acid having zero to three substituents of the class consisting of methyl and halogen groups and having at least two adjacent unsubstituted ring carbon atoms to form the corresponding dihydroxylated benzoic acid derivative which comprises:
   a. establishing a growth of micro-organism cells in a nutrient medium, said micro-organism being a Nocardia species normally incapable of hydroxylating said benzoic acid but being capable of induction of such activity;
   b. inducing said species by incorporating into said growth of micro-organism cells in a nutrient medium an hydroxylation-inducing amount of a compound selected from the group consisting of p-xylene, m-xylene, o-xylene, benzene, toluene, biphenyl, naphthalene, 2-methylnaphthalene, tetralin, and p-chlorotoluene, and contacting the cells therewith under aerobic conditions;
   c. thereafter subjecting said benzoic acid to the action of the induced cells under aerobic fermentation conditions;
   d. and recovering from the fermentation medium a dihydroxylated product of said benzoic acid.

2. The process according to claim 1 wherein said fermentation conditions include a pH level of from about 5.5 to 9.5.

3. The process according to claim 1 wherein the induced species of Nocardia is a member of the species *Nocardia corallina*, *Nocardia salmonicolor*, or *Nocardia minima*.

4. The process according to claim 1 wherein the micro-organism is selected from the group consisting of ATCC No. 19,070; ATCC No. 19,071; ATCC No. 19,148; ATCC No. 19,149; and 19,150.

5. The process according to claim 1 wherein the benzoic acid is p-toluic acid, the inducer is biphenyl, the induced organism is *Nocardia salmonicolor*, ATCC No. 19,149, and the product recovered is 2,3-dihydroxy-p-toluic acid.

* * * * *